United States Patent Office 3,244,675
Patented Apr. 5, 1966

3,244,675
POLY(1,3-OXAZA-2,4-DIONES) POLYMERS
Rudolph J. Angelo, Wilmington, Del., assignor to E. I.
du Pont de Nemours and Company, Wilmington, Del.,
a corporation of Delaware
No Drawing. Filed Mar. 4, 1963, Ser. No. 262,319
13 Claims. (Cl. 260—77.5)

This invention relates to a novel class of polymers and processes for preparing them.

The novel class of polymers are poly (1,3-oxaza-2,4-diones) hereinafter called poly (oxazadiones). These polymers are extremely stable at high temperatures and are inert to most solvents at all temperatures. In the form of shaped articles, e.g. films, fibers, rods, tubes, etc., they are substantially colorless, flexible, strong and, in short, have a multitude of desirable properties. Their stability, although a very desirable characteristic in many end uses, makes these polymers very difficult to form into shaped articles. For example, they cannot be melt extruded easily because of their thermal stability as characterized by their high melting points.

One object of this invention is to overcome this particular shortcoming and provide a process for producing shaped articles of the poly (oxazadiones). The process that has been discovered involves first forming a shapeable intermediate, then shaping the intermediate into a useful article and, thereafter, converting the intermediate in the form of the shaped article into the stable polymer containing the oxazadione rings.

Specifically, one such process involves first forming a polyurethane of a dihydroxy, dibasic ester of an organic acid by the reaction of at least one diisocyanate and at least one dihydroxy compound, the latter having two esterified carboxyl groups, each being ortho or alpha to a hydroxyl group when the starting acid is aromatic and each being attached to a carbon atom to which a hydroxyl group is also attached when the acid is aliphatic, i.e. as close as possible in accordance with the structural limitations of the compound. In the next step, the polyurethane is shaped into a useful article, e.g. by casting a film or extruding filaments through a spinneret. Thereafter, the polyurethane in the form of the shaped article may be heated so that it converts to the corresponding poly (oxazadione) by the elimination of one molecule of alcohol per oxazadione ring.

Another process for producing shaped articles of poly (oxazadiones) involves forming a polyamide of a carbonate ester of a dihydroxy, dibasic acid in which each hydroxyl group is as close as possible to each carboxyl group in accordance with the limitation of the compound, i.e. ortho or alpha when the acid is aromatic and attached to the same carbon atom when the acid is aliphatic. This is accomplished by forming the diacid halide or anhydride after converting to the carbonate ester and then reacting at least one diacid halide or anhydride of the carbonate ester of the defined acid with at least one diamine. In the next step, the polyamide is formed into a useful article such as a film, filament, tube, etc., by the processes well known in the art such as casting, extruding or the like. Thereafter, the shaped article of the polyamide is cyclized to the corresponding poly (oxazadione) by heating the article.

The final cyclized products, the poly (oxazadiones), are of the following general formula:

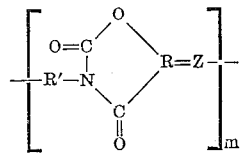

wherein R' is arylene or alkylene, R is a tetravalent organic radical of at least 2 carbon atoms, and Z is the radical

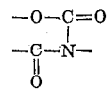

wherein the valences from O and C are attached to adjacent carbon atoms of an aromatic ring when R is aromatic and are attached to the same carbon atom when R is aliphatic and wherein $m$ is an integer sufficiently high to provide a film-forming polymer. When R is aromatic, the products are poly(aryl-1,3-oxazine-2,4-diones); and when R is aliphatic, poly(1,3-oxazoline-2,4-diones).

The starting materials in the first mentioned process are dihydroxy, dibasic acids and diisocyanates. The acids are characterized by having each carboxyl group ortho or alpha to a hydroxyl group when the acid is aromatic and having each pair of carboxyl and hydroxyl groups attached to the same carbon atom when the acid is aliphatic. In the second process, the starting materials are the same dihydroxy, dibasic acids and diamines having substantially the same nucleus as the aforementioned diisocyanates. In the first process, the carboxyl groups of the dihydroxy, dibasic acid are blocked by esterification in the conventional manner, e.g. with an alcohol, an organic halide in alkaline medium, boron trifluoride and isobutylene, diazomethane, etc., preparatory to reaction with the diisocyanate to form the polyurethane. In the second process, the hydroxyl groups of the dihydroxy, dibasic acid are blocked by esterification with alkyl or aryl halocarbonates prepartory to reaction with the diamine to form the polyamide.

The dihydroxy, dibasic acids useful in thee present invention include:

2,4-dihydroxy isophthalic acid
4,6-dihydroxy isophthalide acid
2,3-dihydroxy terephthalic acid
2,5-dihydroxy terephthalic acid
3,3'-dicarboxy-4,4'-dihydroxy biphenyl
bis(3-carboxy-4-hydroxyphenyl)methane
1,4-dihydroxy-2,3-dicarboxy naphthalene
1,5-dihydroxy-2,6-dicarboxy napthalene
tartaric acid
bis(3-hydroxy-4-carboxyphenyl) methane
3,3'-dihydroxy-4,4'-dicarboxy biphenyl
bis(3-carboxy-4-hydroxyphenyl) ether
bis(3-hydroxy-4-carboxyphenyl) ether
bis(3-carboxy-4-hydroxyphenyl) sulfide
bis(3-hydroxy-4-carboxyphenyl) sulfide
bis(3-carboxy-4-hydroxyphenyl) sulfone
bis(3-hydroxy-4-carboxyphenyl) sulfone
α,α'-dihydroxy acid
α,α-dihydroxypimelic acid
α,α'-dihydroxysebacic acid
1,4-dihydroxy-1,4-decarboxy cyclohexane
1,4-phenylene-bis(α-hydroxyacetic acid)
bis(2-hydroxy-3-carboxypropyl) ether
and bis(2-hydroxy-3-carboxypropyl) sulfide.

The diisocyanates and diamines useful in the present invention are those having the following structural forfula: Y—R'—Y wherein Y is —NH₂ or —N=C=O; and wherein R' is a divalent organic radical (aromatic, aliphatic, cycloaliphatic, heterocyclic, bridged aromatic or substituted derivatives thereof, etc.), preferably aromatic, for example, phenylene, naphthylene, biphenylene, anthraylene, furylene, benzylfurylene and $$\langle\!\bigcirc\!\rangle\text{---}R^2\text{---}\langle\!\bigcirc\!\rangle$$

wherein $R^2$ is selected from the group consisting of alkylene 1-4 carbon atoms, $$-O-,\ -\underset{\phantom{R}}{\overset{\phantom{R}}{N}}-,\ -\underset{R^4}{\overset{R^3}{Si}}-,\ -O-\underset{R^4}{\overset{R^3}{Si}}-O-,\ -S-,\ -\underset{\overset{\|}{O}}{\overset{\overset{O}{\|}}{S}}-,\ -\underset{\overset{\|}{O}}{\overset{R^3}{P}}-$$

and $$-O-\underset{\overset{\|}{O}}{\overset{R^3}{P}}-O-$$

where $R^3$ and $R^4$ are alkyl or aryl.

Among the diamines which are suitable for use in the present invention are:
meta-phenylene diamine;
paraphenylene diamine;
4,4′-diamino-diphenyl propane;
4,4′-diamino-diphenyl sulfide;
4,4′-diamino-diphenyl sulfone;
3,3′-diamino-diphenyl sulfone;
4,4′-diamino-diphenyl ether; 2,6-diamino-pyridine;
bis-(4-amino-phenyl)diethyl silane;
bis-(4-amino-phenyl)phenyl phosphine oxide;
bis-(4-amino-phenyl)-N-methylamine;
1,5-diamino-naphthalene;
3,3′-dimethyl-4,4′-diamino-biphenyl;
3,3′-dimethoxy benzidine;
2,4-bis(beta-amino-t-butyl)toluene;
bis-(para-beta-amino-t-butyl-phenyl) ether;
para-bis-(2-methyl-4-amino-pentyl) benzene;
para-bis-(1,1-dimethyl-5-amino-pentyl)benzene;
m-xylylene diamine; p-xylylene diamine;
bis(para-amino-cyclohexyl)methane;
hexamethylene diamine; heptamethylene diamine;
octamethylene diamine; nonamethylene diamine;
decamethylene diamine;
3-methyl-heptamethylene diamine;
4,4-dimethylheptamethylene diamine;
2,11-diamino-dodecane;
1,2-bis-(3-amino-propoxy) ethane;
2,2-dimethyl propylene diamine;
3-methoxy-hexamethylene diamine;
2,5-dimethylhexamethylene diamine;
2,5-dimethylheptamethylene diamine;
5-methylnonamethylene diamine;
1,4-diamino-cyclo-hexane; 1,12-diamino-octadecane;

$$H_2N(CH_2)_3O(CH_2)_2O(CH_2)_3NH_2$$
$$H_2N(CH_2)_3S(CH_2)_3NH_2;\ H_2N(CH_2)_3N(CH_2)_3NH_2$$

and mixtures thereof.

The operable diisocyanates include all those corresponding to the diamines specified in the previous paragraph. It should be noted that in the preferred diisocyanates, the two isocyanate groups are attached directly to an aromatic ring and may be attached either to the same ring or to different rings. A more specific list of the diisocyanates that may be used in the present invention follows:
m- and p-phenylene diisocyanate;
2,4-toluene diisocyanate;
4,4′-dimethoxy-3,3′-diisocyanatobiphenyl;
3,3′-dimethoxy-4,4′-diisocyanatobiphenyl;
4-chloro-1,3-phenylene diisocyanate;
1,5-naphthylene diisocyanate;
2,6-naphthylene diisocyanate;
bis(4-isocyanatophenyl) methane;
bis(4-isocyanatophenyl) ethane;
cumene-2,4-diisocyanate;
4-methoxy-1,3-phenylene diisocyanate;
4-phenoxy-1,3-phenylene diisocyanate;
4-ethoxy-1,3-phenylene diisocyanate;
2,4′-diisocyanato diphenyl ether;
4,4′-diisocyanato diphenyl ether;
5,6-dimethyl-1,3-phenylene diisocyanate;
2,4-dimethyl-1,3-phenylene diisocyanate;
benzidine diisocyanate (4,4′-diisocyanato diphenyl);
4,6-dimethyl-1,3-phenylene diisocyanate;
1,4-anthracene diisocyanate;
9,10-anthracene diisocyanate;
3,3′-dimethyl-4,4′-diisocyanato diphenyl;
2,5-fluorene diisocyanate; 1,4-diisocyanatocyclohexane;
2,5-diamino-1,3,4-oxadiazole;
hexamethylene diisocyanate;
decamethylene diisocyanate;
trimethylene diisocyanate;
dodecamethylene diisocyanate and 2,6-diisocyanato benzfurane.

PROCESS 1

The first step in this process involves the preparation of a polyurethane by the reaction of at least one diisocyanate with at least one dihydroxy, dibasic ester of an organic acid, preferably of an aromatic acid. The esters, prepared from the acids by conventional methods, i.e. reaction with an alcohol of the formula $R^5OH$ or $R^6OH$ wherein $R^5$ and $R^6$ are lower alkyl or aryl, have carboalkoxy or carboaryloxy substituents, each of these substituents being ortho or alpha to each hydroxyl group. Some typical esters follow: 2,4-dicarbomethoxy resorcinol; 2,4-dicarboethoxy resorcinol; 4,6-dicarboethoxy resorcinol; 2,5-dicarboethoxy or methoxy hydroquinone; 2,4-carbobutoxy resorcinol; bis(3-carbomethoxy-4-hydroxyphenyl) methane; 3,3′-dicarbomethoxy-4,4′-dihydroxy biphenyl; 1,4-dihydroxy-2,3-dicarboethoxy naphthalene; and 1,5-dihydroxy-2,6-dicarbomethoxy naphthalene.

Reaction is generally obtained by first dissolving the diisocyanate and the dihydroxy compound in an inert solvent, e.g. N-methyl pyrrolidone, dioxane, monochlorobenzene, toluene, dimethylformamide, dimethylacetamide, dimethylsulfoxide, tetramethylene, sulfone, carbon tetrachloride, acetone, methyl ethyl ketone, methyl isobutyl ketone, etc. A basic catalyst, usually a tertiary amine e.g. triethylamine, trimethylamine, triisopropylamine, tri-n-butylamine, pyridine, quinoline, isoquinoline, N,N-dimethylaniline, etc. is added and the mixture is heated at a temperature of 25–150° C., the temperature being at or near the refluxing temperature of the solvent for a time sufficient to produce a polymer. This time is usually 0.5–3 hours but may be more or less depending upon the desired degree of polymerization.

The intermediate polyurethane may be represented by the following formula:

$$\left[\begin{array}{c}\overset{H}{|}\ \overset{O}{\|}\qquad\qquad\overset{O}{\|}\ \overset{H}{|}\\-R^1-N-C-O-\ \ -O-C-N-\\ \qquad\qquad R\\ R^5-O-C-\quad -C-O-R^6\\ \qquad\ \|\qquad\qquad\ \|\\ \qquad\ O\qquad\qquad\ O\end{array}\right]_m$$

wherein R is a tetravalent organic radical of at least 2 carbon atoms; $R^1$ is arylene or alkylene and includes the specific radicals shown for the diisocyanates; $R^5$ and $R^6$ are each lower alkyl (1–5 carbon atoms) or aryl.

After forming the polyurethane, the polymer may be cast or extruded as films, filaments, rods, tubes, etc. The shaped article obtained is then heated to a temperature of at least 200° C. but below the degradation temperature of the final polymer, preferably in a vacuum or inert atmosphere, for a time sufficient to cyclize the polyurethane to the poly (oxazadione). It should be understood that the intermediate polymer for shaping need not be composed completely of polyurethane. Some of the cyclic product may be present. However, the intermediate polymeric composition must contain sufficient polyurethane to be shapeable. The time required for cyclizing will depend upon the particular polyurethane and the amount of the polyurethane present in the intermediate composition and will vary from a few minutes to an hour or more.

It should be understood that the sulfur analogs may be substituted for the dihydroxy compounds and/or the diisocyanates in the process of this invention. In this manner, a bis thiosalicyclic acid ester and/or a diisothiocyanate may be substituted for all or part of the dicarboalkoxy dihydric phenol and/or diisocyanate to prepare the intermediate that eventually leads to a poly (oxazadione) having one or more oxygen atoms replaced by sulfur atoms.

PROCESS 2

In this process, the intermediate polyamides are prepared from diamines and diacid halides or anhydrides of of the carbonate diester of the dihydroxy, dibasic acid. In the first step, which step is actually a preliminary step, the carbonate diester of the dihydroxy, dibasic acid is prepared to block or protect the hydroxyl groups during subsequent polymerization. For this purpose, an alkyl or aryl halocarbonate of the formula

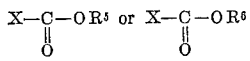

is used wherein X is halogen of atomic weight greater than 19 and $R^5$ and $R^6$ are lower alkyl or aryl. Some useful halocarbonates include methyl, ethyl propyl, isopropyl, butyl (4 isomers), amyl (8 isomers) or phenyl chlorocarbonates.

In a typical example, the alkyl chlorocarbonate, e.g., methyl chlorocarbonate, is added in about 10 mole percent excess over the stoichiometric amount to a solution of the dihydroxy acid, e.g. 2,4-dihydroxy isophthalic acid in acetone at a temperature of 0–5° C., the solution also containing a basic catalyst, e.g. triethylamine. The basic catalyst functions as a solubilizing agent for the acid and also as an acid acceptor. Any tertiary amine, e.g. triethylamine, pyridine, etc. may be used in this capacity. The temperature maintained during this particular reaction is preferably low (−20°–+10° C.) which temperature may be maintained using an ice or brine bath. The useful solvents for this step include acetone, methyl ethyl ketone, methyl isobutyl ketone, heptane, benzene, tetrahydrofuran, dioxane or mixtures thereof. After stirring the reaction mixture for an extended period of at least one hour, acetic acid, hydrochloric acid, dilute sulfuric acid or dilute nitric acid is added. The resulting mixture is then added to be crushed ice to yield the alkyl carbonate diester of the dihydroxy acid.

In the next step, the diacid halide or anhydride of the substitute dihydroxy acid is formed. This is done in order to increase the activity of the carboxyl group for the subsequent polymerization. The diacid halide is formed by the addition of an excess of a thionyl halide, a phosphorus oxyhalide, an oxylyl halide, or a carbonyl halide, e.g. thionyl chloride, phosphorus trichloride, or phosgene. The anhydride is formed by the addition of an anhydride of a fatty acid (acetic anhydride) or an anhydride of an alpha-halogenated fatty acid (trifluoroacetic anhydride, trichloroacetic anhydride, difluoroacetic anhydride, dichloroacetic anhydride). Pyridine or dimethylformamide or dimethylacetamide is added in order to catalyze the reaction. The reaction may be conducted in an inert solvent such as o-xylene. Excess chlorinating agent is removed and the organic acid chloride is purified by recrystallization and/or vacuum distillation.

In the next step, the diacid chloride is reacted with the diamine to form the polyamide. In the solution method, the diacid chloride is added to a solution of the diamine in a solvent. As a solvent, N,N'-dimethylacetamide may be used. Other possible solvents include N,N'-dimethylformamide. The product of this step is the intermediate polymeric composition containing the shapeable polyamide having the following formula:

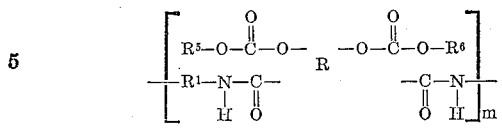

wherein R is a tetravalent organic radical of at least 2 carbon atoms; $R^1$ is arylene or alkylene and includes the specific radicals shown for the diamines; $R^5$ and $R^6$ are each lower alkyl (1–5 carbon atoms) or aryl.

The polymeric composition may then be cast or extruded as a film, filament, rod, tube, etc. The resulting shaped article is then heated to a temperature of about 200–300° C., preferably in vacuo and in the presence of a flowing inert gas such as nitrogen, for a time sufficient to cyclize the polyamide to the poly (oxazadione). The flowing inert gas serves to remove by-product alcohol and helps to minimize the oxidative effects of the high temperature. It should be understood that this intermediate composition need not be composed completely of the polyamide. Some of the poly (oxazadione) may also be present. However, this composition must contain sufficient polyamide to be shapeable. The time required for cyclizing will depend upon the particular polyamide, the temperature used, the amount of polyamide present in the intermediate, etc., and will vary from a few minutes to an hour or more.

The invention will be more clearly understood by referring to the examples which follow, Example 1 representing the best mode contemplated for practicing the invention. It is understood that the examples, although illustrating specific embodiments of the present invention, should not be considered limitative of the invention.

The determination of the structure is accomplished by Infrared Spectral Techniques* known to those skilled in the art. The majority of the infrared spectra herein were taken on pressed films by the use of a Perkin-Elmer Model 21 Spectrophotometer and a Perkin-Elmer Infracord Spectrophotometer.

Inherent viscosity, which is directly related to the molecular weight of the polymer, is defined by L. H. Cragg in the Journal of Colloid Science, volume I, pages 261–9 (May 1946) as:

$$\text{Inherent viscosity} = \frac{\ln \text{relative viscosity}}{C}$$

where relative viscosity is the ratio of the solution viscosity to the solvent viscosity, and C is the concentration of solute in solution measured as grams of polymer per 100 ml. of solution.

*Example 1*

The methyl carbonate of 4,6-dihydroxy isophthalic acid is prepared as follows:

Methyl chlorocarbonate is added in 10% molar excess over a period of one hour to a cooled solution of 4,6-dihydroxy isophthalic acid (99.5 g.; 0.5 mole) in 500 ml. of acetone containing 152 g. (1.5 moles) of triethylamine. The triethylamine causes the 4,6-dihydroxy isophthalic acid to dissolve in the acetone and also functions as an acid acceptor. The reaction mixture is allowed to stir an additional hour at 0–5° C. The slurry thus obtained is treated with 500 ml. of 50% hydrochloric acid and added to crushed ice, from which the resulting product is separated. Chemical analysis of a recrystallized sample confirms that the product is the desired methyl carbonate of 4,6-dihydroxy isophthalic acid.

Thionyl chloride (500 g.; 4.2 moles) is added to 100 g. (0.417 mole) of the methyl carbonate of 4,6-dihydroxy isophthalic acid. Five drops of pyridine are added. The ---
*W. M. D. Bryant and R. C. Voter, Journal of American Chemical Society, 75, 6113 (1953); and F. W. Billmeyer, "Textbook of Polymer Chemistry," chapter 7, Interscience Publishers, 1957.

mixture is stirred for five hours at 60–70° C. The slightly cloudy solution is allowed to stir overnight at room temperature. The excess thionyl chloride is stripped at 50° C. under vacuum, leaving a viscous oil. This oil is kept under a high vacuum (less than 0.1 mm.) for 6 hours to remove the last traces of thionyl chloride. The oil crystallizes with difficulty to the white solid diacid chloride of 4,6-dihydroxy isophthalic acid.

The diacid chloride of the bis(methyl carbonate ester) of 4,6-dihydroxy isophthalic acid is added to an equimolar amount of bis(4-aminophenyl) ether dissolved in N,N'-dimethylacetamide. Agitation is continued at room temperature for about 2 hours, when polyamide of the desired molecular weight is obtained. Dissolved hydrogen chloride is neutralized with ammonia and the resulting ammonium chloride is removed by filtration. The solution of this polyamide is cast onto a steel plate, which is then heated at 300° C. in a vacuum oven under a stream of nitrogen until each pair of amide and methyl carbonate groups has split out methyl alcohol and has cyclized to the desired oxazine ring. The product is a tough, stiff, flexible and quite thermally stable film.

When the above diacid chloride is added to equimolar amounts of m-phenylenediamine and of bis(4-aminophenyl) methane, using the procedure given immediately above, the corresponding polyamides form and convert, on heating at 300° C., into the corresponding polymeric oxazadiones, in this case, polymeric benzoxazinediones.

Example 2

The dimethyl ester of 2,5-dihydroxy terephthalic acid is prepared by reacting 19.8 g. (0.1 M) of 2,5-dihydroxy terephthalic acid with 500 ml. of dry methanol in 500 ml. of dry benzene and 10 ml. of concentrated $H_2SO_4$. The mixture is refluxed for 3 days during which time an attempt is made to remove the water formed by the esterification reaction. However, no water layer is formed in the separator. Most of the solvent is stripped off and excess water is added. A white precipitate is obtained and washed several times with water. The remainder is a yellow oil which is treated with hot water and sodium bicarbonate until no further frothing is noted. The oil is separated and upon cooling yields a solid. The solid is recrystallized twice from an ethanol/water mixture to yield 12.3 g. of the dimethyl ester of 2,5-dihydroxy terephthalic acid in the form of a white powder melting at 135–140° C.

The polyurethane of the dimethyl ester of 2,5-dihydroxy terephthalic acid and 2,4-toluene diisocyanate is prepared in the following manner. One and seventy-four hundredths grams (0.01 M) of freshly distilled 2,4-toluene diisocyanate is added to 2.26 g. (0.01 M) of the dimethyl ester of 2,5-dihydroxy terephthalic acid in 20 ml. of N-methyl pyrrolidone. Three drops of triethylamine are added and the temperature rises from 25 to 35° C. with the development of a yellow color. The solution is stirred and heated at 90–100° C. for 3 hours. Casting on a glass plate, followed by solvent evaporation, leaves a clear, colorless film. The infrared spectrum of the film indicates the orthocarbomethoxy polyurethane structure with strong N=H and $CH_3$ absorptions at 3.0 and 3.45 and carbonyl absorptions at 5.6–6.0, characteristic of ester and urethane links.

The polymer solution is also cast on polished steel plates and solvent is removed at 120° C. to obtain films. These films are heated in a vacuum oven at 200° C. for 30 minutes, and at 275° C. for 30 minutes. At 200° C., the films are yellow and brittle without any significant change of the polyurethane infrared spectrum. At 275° C., a yellow film is obtained that is tough and flexible. The infrared spectrum shows significant changes characteristic of the benzoxazinedione structure. The N=H absorption of 3.0 is diminished. The $CH_3$ absorption (from the methyl ester) at 3.45 has practically disappeared and the carbonyl absorptions 5.6–6.0 has sharpened with some splitting. These signify a poly (benzoxazinedione) structure.

Substitution of 1,5-dihydroxy-2,6-dicarboxy naphthalene for 2,5-dihydroxy terephthalic acid in the procedure immediately above leads to the corresponding poly (naphoxazinedione).

Examples 3–4

When the dimethyl ester of 4,6-dihydroxy isophthalic acid or 3,3'-dicarboxy-4,4'-dihydroxy biphenyl is substituted for the dimethyl ester of 2,5-dihydroxy terephthalic acid in Example 2, the corresponding polyarylurethane is produced. Each of these is cast into film and then converted to the corresponding poly (benzoxazine-2,4-dione) by heating at 275° C. for 30 minutes. A tough, flexible film is produced in each case.

Examples 5–10

Example 2 is repeated, substituting each of the following diisocyanates for 2,4-toluene diisocyanate: m-phenylene diisocyanate; 4,4'-dimethoxy-3,3'-diisocyanatobiphenyl; 4-chloro-1,3-phenylene diisocyanate; 4,4'-biphenylene diisocyanate; 4,4'-diisocyanato diphenyl ether; and 1,5-naphthylene diisocyanate. The product in each case is a tough, flexible film of the corresponding poly (benzoxazine-2,4-dione).

Example 11

The preparation of the polyurethane from dimethyl tartrate and 4,4'-dimethoxy-3,3'-diisocyanatobiphenyl is carried out by adding 5.92 g. (0.02 mole) of the diisocyanate to 3.56 g. (0.02 mole) of dimethyl tartrate in 30 ml. of N-methyl pyrrolidone. Three drops of triethylamine are added, causing a slight yellowing but no temperature rise. The solution is heated at 70° C. for 3 hours and becomes darker yellow and slightly more viscous. The solution is cast on a glass plate to yield a brittle yellow film. The solution is precipitated with methanol, washed and dried to yield 3.75 g. of product melting higher than 300° C. This tan powder has an inherent viscosity of 0.13 (0.5% solution in N-methyl pyrrolidone). The product has an infrared spectrum characteristic of a carbomethoxyurethane as judged from monomeric derivatives of methyl esters of α-hydroxy acids and phenylisocyanate. The spectrum also shows a trace of carbonyl splitting which is characteristic of the cyclized oxazolinedione structure.

Example 12

A similar experiment is carried out using 2,4-toluene diisocyanate 3.48 g. (0.02 mole) and dimethyl tartrate 3.56 g. (0.02 mole) in 20 ml. of N-methyl pyrrolidone with 3 drops of triethylamine. A product is obtained which has an inherent viscosity of 0.05 (0.5% solution in N-methyl pyrrolidone) and yields a brittle film. The product has an infrared spectrum characteristic of a carbomethoxy urethane. Samples cast on steel plates are then subjected to higher temperatures to cause thermal conversion to the oxazolinedione structure. A sample treated at 300° C. in a vacuum oven for 15 minutes shows spectrum changes characteristic of a partially cyclized product.

Example 13

To a solution of 4.13 g. (0.02 mole) of diethyl tartrate in 20 ml. of cyclohexanone is added 5.0 g. (0.02 mole) of bis(4-isocyanatophenyl) methane. The temperature of the solution is quickly brought to 115° C., and the mixture is heated at this temperature for 3–4 hours. The resulting yellow, highly viscous solution is cast on to glass plates, yielding clear, flexible films. These have moduli of about 280,000 p.s.i., break tenacities of about 10,500 p.s.i. and a zero strength of 190° C. ±5° C.

A sample of the polymer is isolated from the cyclohexanone solution by pouring into water. The precipitated polymer is collected by filtration and then dried in a vacuum oven at 100° C. The yield is theoretical. Infrared spectrum of this material confirms that this material is the desired polyurethane.

*Analysis.*—Calc'd: C, 60.52; H, 5.30; N, 6.14. Found: C, 61.02; H, 5.71; N, 6.10.

Example 14

To a solution of 4.13 g. of diethyl-d-tartrate in 20 ml. of chlorobenzene is added 3.20 g. of m-phenylene diisocyanate. The mixture is heated at 132–133° C. for 2½ hours. A precipitate forms during reaction. This is removed by filtration and dried in a vacuum oven at 80° C. The inherent viscosity of this material is 0.23 in dimethylformamide at room temperature, and it is identified as the desired dicarbomethoxy polyurethane.

Example 15

To a solution of 5.25 g. of di-n-butyl-d-tartrate in 16 ml. of cyclohexanone is added 5.0 g. of bis(4-isocyanatophenyl) methane. The mixture is heated at 110° C. for 4 hours, yielding a viscous yellow solution. This solution is cast under glass plates to yield (after solvent removal) clear, self-supporting films. The inherent viscosity as a 0.5% solution in dimethylformamide at room temperature is 0.25. This polymer gives the characteristic urethane infrared spectrum, and is identified as the desired dicarbobutoxy polyurethane.

*Analysis.*—Calc'd: C, 63.27; H, 6.29; N, 5.47. Found: C, 63.00; H, 6.18; N, 5.66.

Example 16

To a solution of 5.25 g. of di-n-butyl-d-tartrate in 20 ml. of cyclohexanone is added 3.20 g. of m-phenylene diisocyanate. The solution is heated at 125° C. for 4 hours. The resulting non-viscous solution is cast on glass plates, giving a coating which is not self-supporting. The inherent viscosity of this polymer in dimethylformamide at room temperature is 0.10. Its infrared spectrum identifies the product as the desired dicarbobutoxy polyurethane.

The poly (oxazadiones) of this invention find many applications in a wide variety of physical shapes and forms. Among the most significant of these forms are films and fibers. Films and fibers of this polymer not only possess excellent physical properties at room temperature, but retain their strength at elevated temperatures for prolonged periods of time. Because of the solubility of the polymer precursors in the preferred processes of preparation, these polymer precursors may be processed into shaped articles such as films, fibers, tubes, rods, sheets and discs by conventional techniques, and then converted into the final high-melting, relatively intractable cyclized polymer, the poly (oxazadione).

The final shaped article may consist of the heterocyclic polymer alone or as a blend with other polymers and/or modified with inert materials. Depending on their nature, the inert materials may be added before or after shaping. For example, fillers such as pigments, electrically conductive carbon black and metal particles, abrasives, dielectrics and lubricating polymers may be added conveniently to the intermediate polymer as such or in a solution of the intermediate polymer before shaping. Certain abrasives and electrically conductive materials are better added as surface layers. A cellular form or foam of the final polymer may be produced by adding a conventional blowing agent to the intermediate polymer, either alone or in combination with a filler, followed by heating to decompose the agent and cyclize the polymer units. Alternatively, cellular products can be made by dispersing bubbles (of air, carbon dioxide, nitrogen, etc.) into a melt or solution of the intermediate polymer before shaping and cyclization.

Instead of being shaped itself, the intermediate polymer can be used as a coating composition. Sometimes a melt of this polymer is suitable, but a solution generally is more useful. The liquid coating composition containing the polymer, either alone or modified by the addition of fillers and/or foaming agents, may be applied by any of the usual techniques (doctoring, rolling, dipping, brushing, spraying) to a great variety of substrates. Such substrates include copper, brass, aluminum, steel and other metals in the form of sheets, fibers, wires, screening; mineral structures such as asbestos; glass in the form of sheets, fibers, foams, fabrics, etc.; polymeric materials such as cellulosic materials (cellophane, wood, paper, etc.), polyolefins (polyethylene, polypropylene, polystyrene, etc.); polyesters (polyethylene terephthalate, etc.), polyamides, polyimides, perfluorocarbon polymers (polytetrafluoroethylene, copolymers of tetrafluoroethylene with hexafluoropropylene, etc.), polyurethanes, in the form of sheets, fibers, foams, woven and nonwoven fabrics, screening, etc.; leather sheets; etc. The polymeric substrates can be metallized before coating, or treated with a conventional adhesive or other agent to improve surface receptivity. Films of the final cyclized polymer can be laminated to any of the above substrates, often with the aid of a commercially available adhesive.

Films formed from the polymer of this invention may be used wherever films have heretofore been used. They serve advantageously in an extensive variety of wrapping, packaging and bundling applications. Additionally, the film-forming polymer may be used in automobile and aviation interior head lining materials, decorative trim, high temperature electrical insulation, in the form of corrosion-resistant pipe, duct work, containers and container linings, and the laminating structures mentioned previously. In fiber form, the polymer of the present invention offers possibilities for high temperature electrical insulation, protective clothing and curtains, filtration media, packing and gusseting materials, brake linings and clutch facings.

What is claimed is:

1. Poly(1,3-oxaza-2,4-dione) having the structural formula:

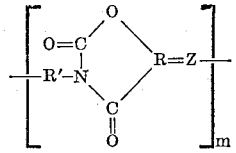

wherein R' is a radical having not more than 20 carbon atoms and is a radical selected from the group consisting of arylene and alkylene;

R is a tetravalent organic radical of at least 2 carbon atoms and not more than 13 carbon atoms and containing no atoms other than carbon, hydrogen, sulfur and oxygen;

Z is the radical

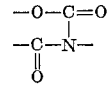

the valences from O and C being attached to adjacent carbon atoms of an aromatic ring when R is aromatic and to the same carbon atom when R is aliphatic; and m is an integer sufficiently high to provide a polymer having an inherent viscosity of at least 0.10 as measured on an 0.5% by weight solution in dimethylformamide at room temperature.

2. Poly (1,3-oxaza-2,4-dione) as in claim 1 wherein R' is

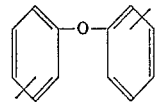

3. Poly (1,3-oxaza-2,4-dione) as in claim 1 wherein R' is

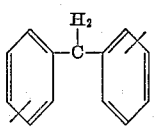

4. Poly (1,3-oxaza-2,4-dione) as in claim 1 wherein R' is phenylene.

5. Poly (1,3-oxaza-2,4-dione) as in claim 1 wherein R' is toluylene.

6. Poly (1,3-oxaza-2,4-dione) as in claim 1 wherein R' is biphenylene.

7. Poly (1,3-oxaza-2,4-dione) as in claim 1 wherein R' is naphthylene.

8. Poly (1,3-oxaza-2,4-dione) as in claim 1 wherein R is

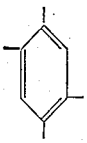

9. Poly (1,3-oxaza-2,4-dione) as in claim 1 wherein R is

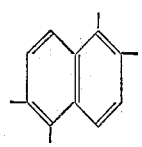

10. Poly (1,3-oxaza-2,4-dione) as in claim 1 wherein R is

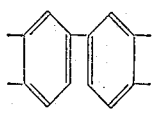

11. Poly (1,3-oxaza-2,4-dione) as in claim 1 wherein R is

12. A process for preparing shaped articles of poly (1,3-oxaza-2,4-diones) from corresponding polyurethane which has been prepared by heating at least one diisocyanate with at least one dihydroxy compound having two esterified carboxyl groups, each of said esterified carboxyl groups being ortho to a hydroxyl group when said dihydroxy compound is aromatic and each of said esterified carboxyl groups being attached to a carbon atom to which a hydroxyl group is also attached when said dihydroxy compound is aliphatic, to form a composition containing polyurethane; said process comprising forming said polyurethane-containing composition into a shaped article; and heating said article to cyclize said polyurethane into the corresponding poly (1,3-oxaza-2,4-dione).

13. A process for preparing shaped articles of poly (1,3-oxaza-2,4-diones) from corresponding polyamide which has been prepared by mixing at least one diamine with at least one compound selected from the group consisting of diacid halides and diacid anhydrides of the carbonate diester of a dihydroxy, dicarboxy acid, each hydroxyl group of said acid being ortho to a carboxyl group when said acid is aromatic and each hydroxyl group of said acid being attached to a carbon atom to which a carboxyl group is also attached when said acid is aliphatic, to form a composition containing polyamide; said process comprising forming said polyamide-containing composition into a shaped article; and heating said article to cyclize said polyamide to the corresponding poly (1,3-oxaza-2,4-dione).

References Cited by the Examiner
UNITED STATES PATENTS

| | | | |
|---|---|---|---|
| 2,866,774 | 12/1958 | Price | 260—77.5 |
| 2,929,800 | 3/1960 | Hill | 260—77.5 |
| 2,930,780 | 3/1960 | Weymouth | 260—77.5 |
| 3,030,339 | 4/1962 | Tousignant et al. | 260—77.5 |
| 3,063,966 | 11/1962 | Kwolek et al. | 260—78 |
| 3,094,511 | 6/1963 | Hill et al. | 260—78 |

LEON J. BERCOVITZ, *Primary Examiner.*

DONALD E. CZAJA, *Examiner.*

M. C. JACOBS, *Assistant Examiner.*